(No Model.)

H. H. SMITH.
MACHINE FOR REMOVING TIRES.

No. 579,352.            Patented Mar. 23, 1897.

Witnesses:
Walter S. Wood
Vene E. Chappell

Inventor,
Henry H. Smith
By Fred L. Chappell
Att'y.

UNITED STATES PATENT OFFICE.

HENRY H. SMITH, OF KALAMAZOO, MICHIGAN, ASSIGNOR OF ONE-HALF TO CHARLES M. CHAMBERLIN, OF SAME PLACE.

MACHINE FOR REMOVING TIRES.

SPECIFICATION forming part of Letters Patent No. 579,352, dated March 23, 1897.

Application filed November 2, 1895. Serial No. 567,860. (No model.)

*To all whom it may concern:*

Be it known that I, HENRY H. SMITH, a citizen of the United States, residing at the city of Kalamazoo, in the county of Kalamazoo and State of Michigan, have invented certain new and useful Improvements in Machines for Removing Tires, of which the following is a specification.

My invention relates to a new and improved device for removing tires from wagon-wheels or vehicle-wheels generally.

The object of my invention is to provide a new and improved machine for accomplishing the removal of tires from wheels where it has heretofore been accomplished by mallets and blocks for driving the same apart.

A further object of my invention is to provide a means whereby the tires can be quickly and easily removed without danger of breaking the wheel or of destroying the tire.

A still further object is to provide a means whereby this result can be accomplished without in any wise injuring the wheel or the tire or even marring the finish upon a new wheel.

A further object is to provide a means which will greatly expedite the removal of tires from wheels.

I accomplish the objects of my invention by the machine shown in the accompanying drawings, in which—

Figure 1:
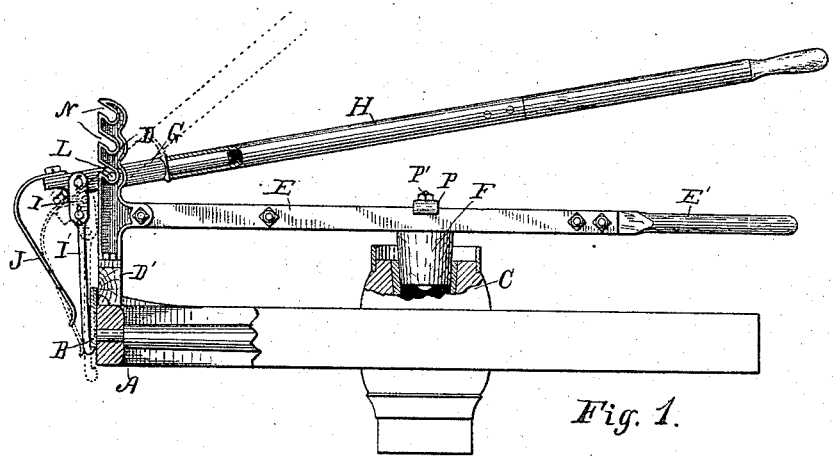
Figure 2:
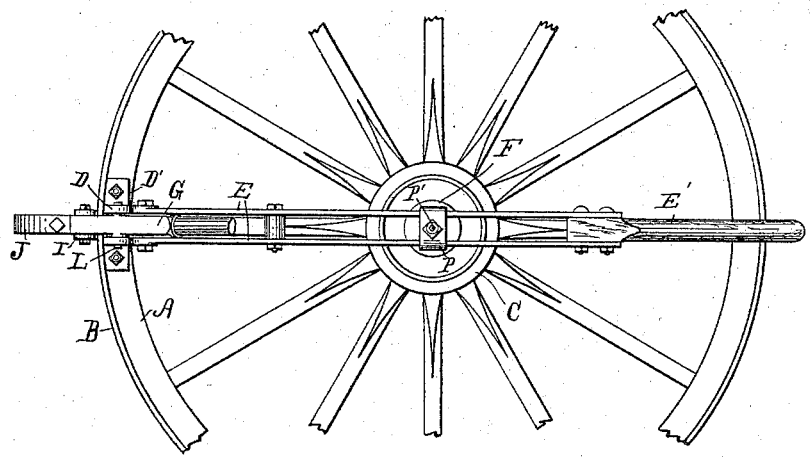

Figure 1 is a side elevation of my machine shown in position upon a broad-tire wagon-wheel, a part of the wheel being broken away to show the exact position of the parts. Fig. 2 is a top plan view of the same with portions of the wheel broken away.

In the drawings similar letters of reference refer to similar parts throughout both views.

Referring to the lettered parts of the drawings, A represents a broad-tire wagon-wheel on which my machine is shown to be in operation. B is the tire on said wheel, and C the hub. Extending across the wheel is a suitable lever E, provided with a handle E' at one end and with a suitable bracket upright portion D at the other. To the lower end of this bracket D is secured a broad block D', the outside of which is curved and corresponds with the periphery of the wheel and is adapted to rest upon the felly. On the under side of the lever E is a plug F, which is adjustable along the same and is intended to fit into the hub C of the wheel to afford a pivotal support for the lever E to guide the block D' over the felly. This block F is adjustable by the clip P, which is secured thereto by a bolt P', extending through the same, and is adjustable to adapt the machine to different-sized wheels. The lever H is supported on a pivot L in the bracket D above the block D'. Connected to the lever is a downwardly-extending hook I, which is connected to the outer end of the lever by links I'. Secured to the outer end of the lever and curving down over the same is a spring which is adapted to press on the outside of the hook I and cause it to engage under the tire B.

In operation it will be readily understood that the operative takes hold of the handle E' after the machine is adjusted so that the block D' comes just inside of the tire and the plug F is in the hub and swings it around, working the lever H up and down, something like a pump-handle, as the block D' is carried around over the felly. When the lever H is raised, the spring K presses against the hook I and causes it to hook under the tire of the wheel. The downward pressure on the lever lifts the tire up with a very positive pressure and as the machine is swung around engages the tire successively at short intervals around the wheel and very quickly removes it without injuring the wheel or the tire.

I desire to state that when this machine is intended for use on light vehicles or on new work the under side of the block D' can be provided with a suitable cushion of felt or leather, and when the machine is then used it will not mar the varnish or paint and will remove the tire perfectly.

It will be observed that notches N N are provided at different heights on the bracket D for engaging the pivot L of the lever. This is to adapt the machine to tires of different widths, and by raising the pivot L a new hold is secured for removing very broad tires a little at a time, which is the ordinary way of removing them.

It will be noted that the lever H is tubular in form and is adapted to be inserted over a suitable shank G, so that the lever can be easily removed when the machine is not in use.

Having thus described my improved tire-pulling machine, I desire to state that it can be greatly varied in its details without departing from my invention.

It will be readily understood that notches N in the bracket are not absolutely necessary, though they serve a very useful purpose in themselves; that the hook I can be secured by different means to the lever H than the links I', and the exact form of the lever H or the lever E or the exact method of adjustment of the block F along the lever E is not material to my invention, though the exact forms I have shown will be found to possess great merits in themselves in the matter of convenience, of construction, and of operation. The spring J is not absolutely necessary to the successful operation of my device, though it serves a very useful purpose and is very desirable in the construction.

Having thus described my invention, what I claim as new, and desire to secure by Letters Patent, is—

1. In a tire-pulling machine the combination of the lever E; the bracket D to one end of said lever; the handle E' at the other; plug F on the under side of said lever E adjustable by means of the clip P and the bolt P'; the block D' below the bracket D adapted to rest upon the felly of the wheel; the lever H with the pivot L therein adapted to engage in suitable notches N on the upper part of the bracket D'; the hook I extending downwardly from said lever H; links I' for attaching said hook I to the outer end of the lever H', and a spring J to the outer end of the lever and curved over and downwardly to press the hook I against the tire of the wheel when lever H is operated, all coacting together substantially as shown for the purpose specified.

2. In a tire-removing machine the combination of the lever E, bracket D to one side of said lever; the plug F adjustable along the under side of said lever, the bracket D to one end of the lever; the block D' below the bracket D adapted to rest on the felly of the wheel; the lever H with the pivot L therein fulcrumed to the upper part of said bracket D; hook I extending downwardly from said lever H adapted to engage under the tire for raising the same off from the wheel, all coacting as specified.

3. In a tire-removing machine, the combination of the lever E, bracket D to one end of said lever, the plug F to the under side of said lever for insertion into the hub of the wheel, the lever H fulcrumed in said bracket, and the hook I suitably connected to the outer end of said lever H for engaging under the tire on the wheel for removing the same as specified.

4. In a tire-removing implement the combination of the cross-piece E, having a suitable handle; a suitable plug on the under side of the said cross-piece for insertion into the hub of a wheel; a block to the outer end of the same for resting on the felly of the wheel the said piece occupying a plane substantially parallel with that of the wheel; a lever pivoted above said block and extending in the general direction of the cross-piece E with a hook connected to the outer end of said lever to extend down and engage under the tire to remove the same, constructed so that the implement can be placed upon the wheel to act thereon all coacting together as specified.

5. In a tire-removing implement the combination of the cross-piece E, having a suitable handle; a suitable plug on the under side of said cross-piece for insertion into the hub of a wheel the said piece occupying a plane substantially parallel with that of the wheel; a block at the outer end of the cross-piece to rest upon the felly of the wheel; a hook to engage the tire and suitable means of actuating the hook as the block is swung around over the felly to remove the tire, all adapted to rest upon the wheel and engage it at the hub and rim and operate as specified.

In witness whereof I have hereunto set my hand and seal in the presence of two witnesses.

HENRY H. SMITH. [L. S.]

Witnesses:
CHARLES M. CHAMBERLIN,
JAY D. DRIVER.